March 9, 1926.

E. R. BURTNETT

INTERNAL COMBUSTION ENGINE

Filed Oct. 24, 1922

Inventor,
Everett R. Burtnett.
By Martin P. Smith, atty.

Patented Mar. 9, 1926.

1,576,306

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed October 24, 1922. Serial No. 596,530.

*To all whom it may concern:*

Be it known that I, EVERETT R. BURTNETT, a citizen of the United States, residing at Los Angeles, county of Los Angeles, State of California, have invented new and useful Improvements in Internal-Combustion Engines, of which the following is a specification.

My invention relates generally to internal combustion engines and more particularly to an engine that operates on a modified two-stroke cycle.

The principal objects of my invention are, to generally improve upon and simplify the construction and operation of the existing forms of similar types of engines, and to provide an engine having a combustion chamber that includes a stratification ignition chamber and which latter receives only, charges of gaseous fuel that are undiluted by any inert volume of the air or residual products of combustion that form the content of the combustion cylinder and piston displacement, at the time of the induction of the gaseous fuel charge, the object being to permit the engine to be operated with extremely high compression of the fuel charges, without detonation or series combustion of each charge.

Further objects of my invention are to provide an engine having combustion cylinders and pumping or supercharging cylinders, each combustion cylinder having a two diameter piston structure that is effective in producing the scavenging and air pumping and compressing operations, the piston of one combustion cylinder, pumping air by its larger diameter skirt during the firing charge compression stroke, to the opposite firing combustion cylinder during the exhaust period; further, to displace the residual products of combustion in the cylinder at the end of the expansion or power stroke, with cool free air, thereby providing a constant cool inert initial volume to the combustion cylinder, such action taking place during the time period between the opening of the exhaust port means and the opening of the gaseous fuel induction port or valve means, the exhaust port means closing before the opening of the gaseous fuel inlet port means, said gaseous fuel induction port means opening after the scavenging air and exhaust port means have closed and the induction of the gaseous fuel volume being additional to the initial scavenging air volume and the content of the combustion cylinder, at the time the exhaust port means and scavenging air inlet port means closes; and further, to provide, in an engine of the character described, means whereby the gaseous fuel induction is affected and controlled by valve means located in the cylinder head, said gaseous fuel being precompressed by externally developed pressure, of a degree sufficient to cause said gaseous fuel to enter the combustion chamber during the first part of the compression stroke or period, thereby supercharging the combustion cylinder with a gaseous fuel volume against the compression resulting from the initial cylinder displacement and compression clearance content, comprising the non-scavenged residual products of combustion, and the free air scavenging volume that was first admitted.

Further objects of my invention are, to provide an engine having but one shaft operating by the two stroke cycle and to actuate the gaseous fuel inlet valves directly from said shaft; to provide an engine in which a greater volume than the piston sweep content at atmospheric pressure, can be inducted into the combustion cylinder, thereby providing a dual volume, viz, an inert volume as an initial content and a supercharged content of gaseous fuel, thereby producing a greater expansion in power development and torque tenacity; to provide for the stratification of the inducted gaseous fuel charge, in an ignition pocket, thereby bringing about instant and complete flame propagation through the pocketed volume of gaseous fuel, the latter being of uniform molecular density, thus reducing the distance of flame travel and eliminating the variation of internal combustion pressure caused by more than one pocket of gaseous fuel existing in the one compressed charge where turbulence was not complete and the admitted fuel charge was diluted by the compression clearance content of residual products of combustion; further, to provide an internal combustion engine that is adaptable to multi-cylinder arrangement and having simple gas mixture inlet manifold structure that will be effective in reducing condensation and unequal volume and charge density distribution to all cylinders where only one carburetor is employed, further, to provide an engine of relatively simple structure, having no valves for the exhaust functions thereby eliminating the overheating, warping and sticking of exhaust valves and further to provide an engine that may be easily and cheaply produced and capable of being readily assembled or taken apart.

With the foregoing and other objects in view my invention consists in certain novel features of construction and arrangement of parts that will be hereinafter more fully described and claimed and illustrated in the accompanying drawings in which:

Figure 1:
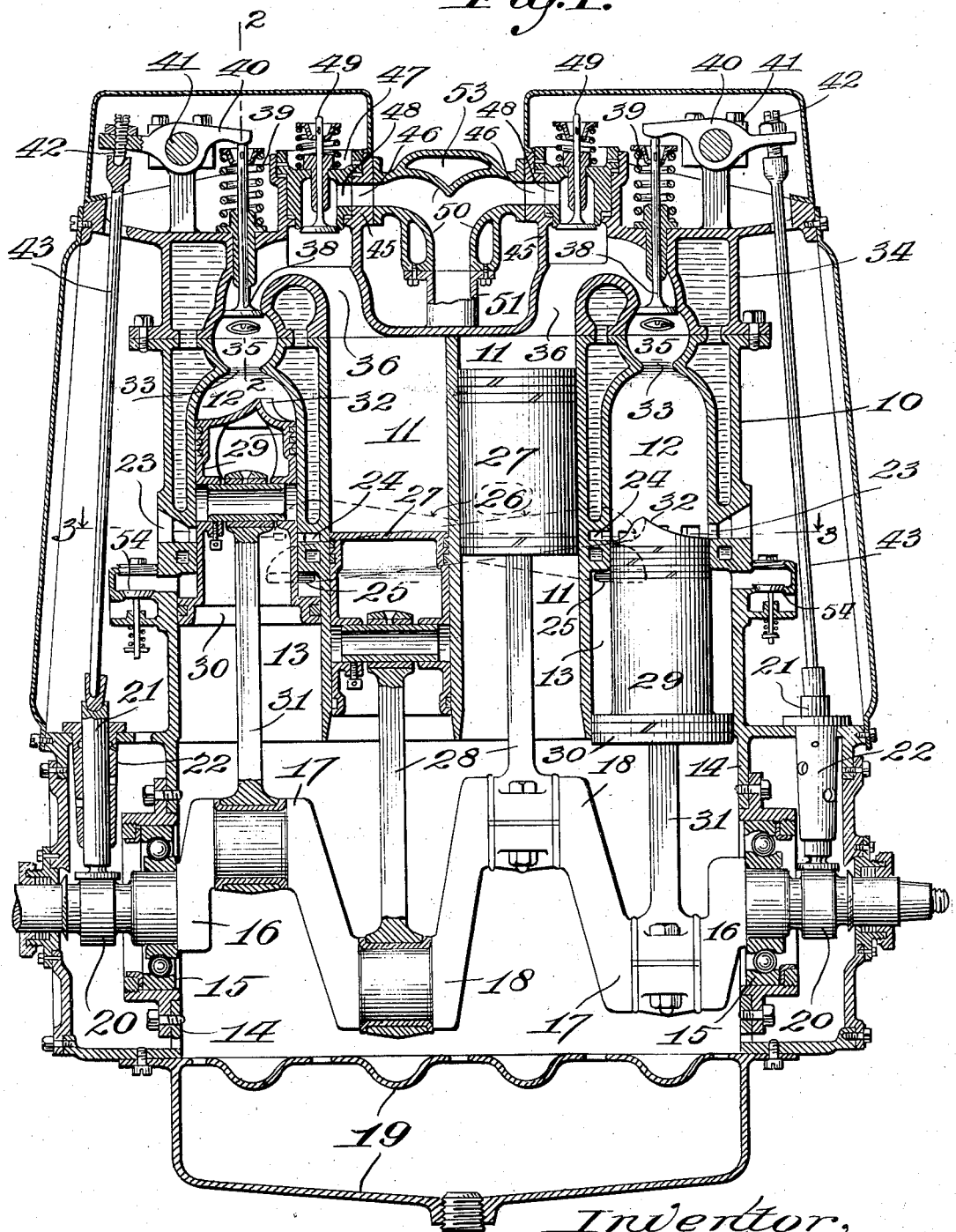
Fig. 1 is a longitudinal vertical section taken through the center of an engine of my improved construction.
Figure 2:
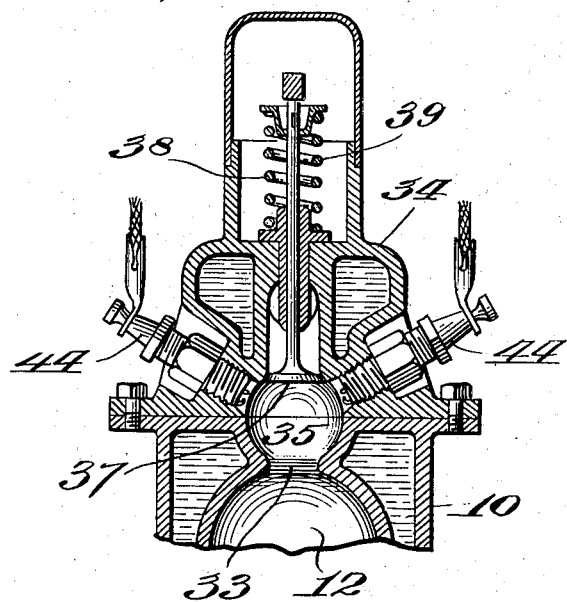
Fig. 2 is a detail section taken on the line 2—2 of Fig. 1.
Figure 3:
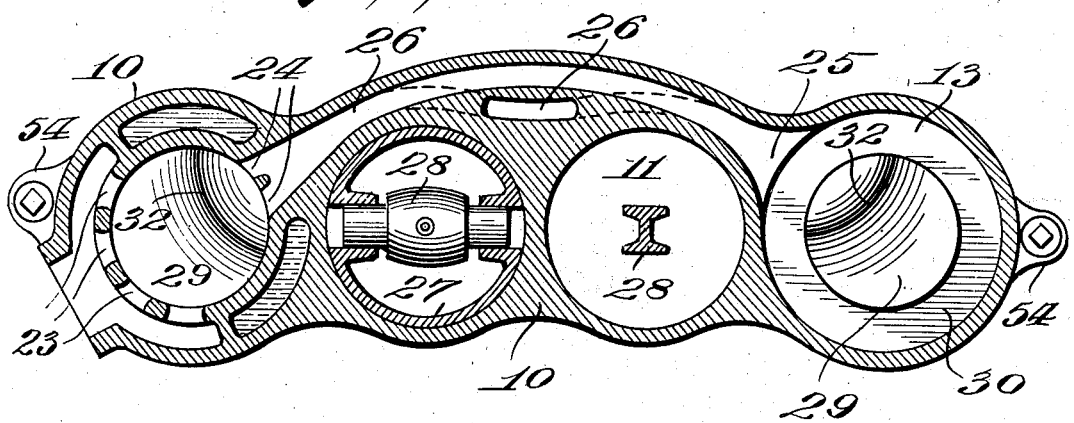
Fig. 3 is a horizontal section taken on line 3—3 of Fig. 1.

Referring by numerals to the accompanying drawings which illustrate a practical embodiment of my invention, 10 designates a cylinder block, in the central portion of which is formed a pair of gaseous fuel compression chambers 11. In each end portion of the block and parallel with the chambers 11 is formed a bore or chamber having two different diameters, the upper chamber of smaller diameter constituting a combustion chamber 12 and the lower chamber of larger diameter constituting an air compressing chamber 13.

Depending from the block 10 is a crank case 14, having anti-friction bearings 15 in its ends for a crank shaft 16. This crank shaft is formed with cranks 17 located directly below the combustion and compressing chambers 12 and 13, and with cranks 18 located below the compression chambers 11.

The bottom of the crank case is closed by a combined oil sump and splash plate 19.

Formed on the end portions of the crank shaft 16 are cams 20 that are for the purpose of opening the valves that control the admission of gaseous fuel into the ignition chambers and bearing on the peripheries of said cams are the lower ends of plungers 21 that are arranged for sliding movement through suitably located bearings 22.

Formed through the wall of the block 10 and leading from the lower portion of each combustion chamber 12 are exhaust ports such as 23 and formed through the wall surrounding each combustion chamber 12 and preferably directly opposite to said exhaust ports, are ports 24 that admit the compressed air utilized in scavenging the combustion chambers.

Formed through the wall of the cylinder block directly below the air inlet ports 24 and communicating with the upper portions of the air compression chambers, are ports 25.

Compressed air ducts 26 are formed in the wall on one side of the cylinder block 10, said ducts crossing each other at an intermediate point and each duct leads from the port 25 of one chamber 13 to the inlet ports 24 of the opposite combustion chamber 12.

By virtue of this arrangement the air compressed in each chamber 13 is transferred to the opposite combustion chamber for scavenging purposes. Arranged for reciprocatory movement within each chamber 11 is a piston 27 and connecting the wrist pin thereof with the corresponding crank 18 is an ordinary connecting rod 28.

Arranged for reciprocatory movement within each chamber 12 is a power piston 29, having on its lower end a skirt portion 30 of larger diameter and which latter performs the functions of an air compressing piston within the chamber 13. The wrist pin of each of these combination pistons is connected to the corresponding crank 17 by an ordinary connecting rod 31.

Formed on top of the head of each piston 21 is a deflecting rib or flange 32, that is disposed and formed so as to deflect the compressed air that enters ports 24 upwardly through the combustion chamber 12.

The pistons 27, 29 and 30 are provided with suitable packing rings. The upper end of each combustion chamber 12 is substantially semi-spherical or dome-shape and said upper end, so shaped, communicates through an axially arranged opening 33 with the lower end of a semi-spherical or cup-shaped recess that is formed in the top of the cylinder block.

Detachably secured on top of the cylinder block 10 and serving as a head for the various chambers therein, is a block or casting 34 and formed in the under face thereof are substantially semi-spherical recesses that coincide with the respective recesses in the top of block 10 above the combustion chambers therein and form substantially spherical ignition chambers 35.

Formed in head block 34 and establishing communication between the ignition chambers 35 and the adjacent chambers 11 are substantially inverted U-shaped ducts 36.

Suitable valve seats are formed at the points where these ducts join the ignition chambers 35 and normally resting on said seats, are gaseous fuel inlet valves 37 that are carried by the lower ends of valve stems 38.

Associated with each valve stem is a compression spring 39 that normally holds the valve upon its seat.

The walls of the blocks 10 and 34 surrounding the combustion chambers 12, ignition chambers 35 and ducts 36 are formed with communicating chambers through which may be circulated a fluid cooling medium, such as water.

Bearing on the upper end of each valve stem 38 is one end of a rocker arm 40 that is fulcrumed on a suitable bracket 41.

The outer end of this rocker arm carries an adjustable member 42 that bears on the upper end of a push rod 43 and the lower end of the latter bears on the upper end of the corresponding plunger 21.

Seated in the side portions of the head 34 above each power cylinder are spark plugs 44, the inner ends of the electrodes of which, project into the upper portion of the ignition chamber 35.

The members of each pair of spark plugs are disposed on opposite sides of the adjacent valve 37 and by thus providing two plugs for each ignition chamber 35, uniform movement of the flame propagation through the compressed charge of gaseous fuel within said chamber is assured.

Formed on head 34, directly above duct 36 is a housing 45, having a gaseous fuel inlet opening 46 and removably seated in each housing is a valve cage 47 having an inlet port 48 that communicates with the adjacent opening 46 and with the adjacent duct 36.

Arranged for operation in each cage is an inlet valve 49 which, as illustrated, may be adapted to open automatically under the suction produced by the downward movement of the piston in the adjacent chamber 11, or suitable means may be provided for mechanically opening said valve.

Located between the housings 45 is tubular Y-connection 50, the ends of the branches thereof being directly connected to the openings 46, and the inlet end of this connection is connected to a suitable source of gaseous fuel supply, preferably a carburetor, by a pipe 51.

A housing 52 is formed around that portion of the connection 50 where the main duct branches, thereby providing a chamber 53.

The exhaust products of combustion from the combustion chambers 12, may be caused to pass through this chamber 53, thereby heating the Y-connection to form a so called "hot spot" and which latter will be effective in heating the gaseous fuel just prior to its entrance into compression chambers 11.

Air is admitted to the compression chambers 13, through inwardly opening check valves 54 that are seated in the wall of the cylinder block at the upper ends of the respective compression chambers.

The operation of my improved engine is as follows:

As power piston 29 passes high center, sparks are produced at the inner ends of the spark plugs 44, thereby igniting at different points, the charge of gaseous fuel that is compressed within the ignition chamber 35 and the resultant expansion is transmitted through the compressed stratum of residual burnt products of combustion and air directly to the head of the piston, thereby driving the same downward on its power stroke.

Just prior to the time the piston reaches low center exhaust port 23 is uncovered to materially reduce the internal pressure and an instant later the compressed air inlet port 24 is uncovered, thereby admitting a charge of air which was compressed in the opposite chamber 13 by the skirt portion 30 of the corresponding piston during its prior upward stroke, and said compressed air flowing through the corresponding transfer duct 26.

This blast of compressed air is deflected through the combustion chamber 12 by flange or ribs 32 on the piston head and, as a result, practically all products of combustion are thus driven from said chamber.

The upper edge of the exhaust port occupies a plane slightly above the plane occupied by the upper edge of the air inlet port 24, consequently the exhaust port opens earlier and closes later than said air inlet port.

On the downward stroke of the piston 29 atmospheric air is drawn into chamber 13 through inlet check valve 54 and on the succeeding upward stroke of the piston, this air is compressed in said chamber 13 and passes through the corresponding transfer duct 26 to the opposite combustion chamber, when the piston therein is at its low center.

As the gaseous fuel compression piston moves downward, gaseous fuel is drawn into chamber 11 past valve 49 from V-connection 50, which latter is heated by the exhaust from the engine and on the upstroke of the piston 27, the preheated gaseous fuel is compressed within the upper portion of chamber 11 and within duct 36, and as the power piston 29 in the adjacent chamber 12 moves upwardly therein, corresponding valve 38 will be opened to permit this charge of compressed gaseous fuel to enter the corresponding ignition chamber 35. As the power piston continues to move upward, the charge of gaseous fuel will be compressed within the ignition chamber with a stratum of residual products of combustion and air between the volume of compressed gaseous fuel and the top of the power piston and at the point of highest compression or immediately thereafter, the compressed charge is ignited as hereinbefore described.

Thus it will be seen that I have produced a two stroke cycle internal combustion engine that possesses superior advantages in point of simplicity, durability and general efficiency.

Obviously the details of construction of my improved engine may be varied in size, form and construction without departing from the spirit of the invention, the scope of which is set forth in the appended claim:

I claim as my invention:

The combination in a two stroke cycle internal combustion engine, of four cylinders arranged in a row parallel with the axis of the crank shaft of the engine, the two end cylinders being of two diameter structure, the two center cylinders being of straight diameter structure, means to by-pass compressed air from the enlarged piston chamber of each center cylinder to the other power chamber at the end of the row, valvular means for admitting a charge to the annular space created between the large diameters of the end cylinders and the pistons therein, valvular means for admitting a charge to the head clearance space of the two center cylinders, valvular means for the transfer of a precompressed charge from the said pump cylinders to the head clearance chamber of the adjacent end cylinders, ports formed in the wall of the lesser diameter of each two diameter end cylinders, a four crank throw crank shaft, a separate connection between each of the four pistons and the crank shaft, each piston being connected to a separate crank throw, the second piston from either end being late in the direction of crank rotation, a sufficient number of degrees relative to the first crank from the same end so as to cause the piston with said second cylinder from the given end, to reach head end dead center at the time the transfer valve in the head of the adjacent end cylinder closes.

In testimony whereof I have signed my name to this specification.

EVERETT R. BURTNETT.